(12) United States Patent
Chen et al.

(10) Patent No.: US 7,170,375 B2
(45) Date of Patent: Jan. 30, 2007

(54) PERMANENT-MAGNET GROUND FAULT CIRCUIT INTERRUPTER PLUG AND ITS PERMANENT-MAGNET MECHANISM THEREIN

(75) Inventors: Wusheng Chen, Yueqing (CN); Yong Dai, Yueqing (CN); Xiaoyong Li, Yueqing (CN)

(73) Assignee: General Protecht Group Inc., Yueqing (CN)

( * ) Notice: Subject to any disclaimer, the term of this patent is extended or adjusted under 35 U.S.C. 154(b) by 30 days.

(21) Appl. No.: 11/184,713

(22) Filed: Jul. 19, 2005

(65) Prior Publication Data

US 2006/0198066 A1 Sep. 7, 2006

(30) Foreign Application Priority Data

Mar. 2, 2005 (CN) .................. 2005 1 0051235

(51) Int. Cl.
*H01H 9/00* (2006.01)
*H02H 3/00* (2006.01)

(52) U.S. Cl. .................. 335/177; 335/6; 335/21; 335/38; 335/166; 335/167; 335/170; 335/171; 335/179; 361/42

(58) Field of Classification Search .......... 335/6, 335/21, 38, 165–182; 361/42, 45, 46, 49, 361/50
See application file for complete search history.

(56) References Cited

U.S. PATENT DOCUMENTS

| | | | | |
|---|---|---|---|---|
| 1,817,526 A | * | 9/1931 | Rudenberg | 361/45 |
| 5,144,516 A | * | 9/1992 | Sham | 361/49 |
| 5,148,344 A | * | 9/1992 | Rao et al. | 361/42 |
| 5,173,673 A | * | 12/1992 | Weigand et al. | 335/18 |
| 5,661,623 A | * | 8/1997 | McDonald et al. | 361/42 |
| 5,862,029 A | * | 1/1999 | Nicol | 361/42 |
| 5,886,860 A | * | 3/1999 | Chen et al. | 361/9 |
| 5,943,199 A | * | 8/1999 | Aromin | 361/42 |
| 6,693,779 B1 | * | 2/2004 | DiSalvo | 361/42 |
| 6,937,451 B1 | * | 8/2005 | Ulrich et al. | 361/42 |
| 6,946,935 B1 | * | 9/2005 | Wu et al. | 335/18 |
| 6,954,125 B1 | * | 10/2005 | Wu et al. | 335/18 |
| D511,469 S | * | 11/2005 | Aromin | D10/75 |
| 6,975,192 B1 | * | 12/2005 | Disalvo | 335/18 |

(Continued)

*Primary Examiner*—Ramon M. Barrera
(74) *Attorney, Agent, or Firm*—Tim Tingkang Xia; Morris, Manning & Martin LLP

(57) ABSTRACT

A permanent-magnet ground fault circuit interrupter plug with self-diagnosing function having an enclosure and a permanent-magnet mechanism encased in the enclosure. In one embodiment, the permanent-magnet mechanism includes a frame assembly having a crossbeam, a frame pressure post and a core connecting post positioned at each side of the crossbeam, a core attached to the core connecting post and positioned inside a coil assembly, a spring sleeved on the core connecting post and positioned therebetween an inner cam of the coil assembly and the crossbeam of the frame assembly; a circuit-breaking coil and a circuit-connecting coil wound on the coil assembly, respectively, a permanently magnet positioned proximately to the core, a pair of movable contact arms with each having one movable contact positioned at each lateral side of the frame pressure post for communicating with the frame assembly, a pair of fixed contacts positioned above the corresponding movable contacts, and a metal oxide varistor with one end electrically connected to a first terminal of a power source directly and the other end electrically connected to a second terminal of the power source from a load side across a circuit breaker.

14 Claims, 7 Drawing Sheets

U.S. PATENT DOCUMENTS 7,009,473 B1* 3/2006 Zhang ........................... 335/6
2004/0070474 A1* 4/2004 Wu et al. ...................... 335/18
2004/0070897 A1* 4/2004 Wu et al. ...................... 361/42
2006/0018062 A1* 1/2006 Wu et al. ...................... 361/42

* cited by examiner

PERMANENT-MAGNET GROUND FAULT CIRCUIT INTERRUPTER PLUG AND ITS PERMANENT-MAGNET MECHANISM THEREIN

FIELD OF INVENTION

The present invention generally relates to a ground fault circuit interrupter (hereinafter "GFCI"), and in particularly to a permanent-magnet GFCI in the form of plugs with a permanent-magnet mechanism applicable to GFCIs in general, current-leakage interrupters and other circuit fault protective devices.

BACKGROUND OF THE INVENTION

Most of GFCIs on the market are in the form of receptacles. Such GFCI receptacles are generally adapted for securely mounting on walls of a building. However, the GFCI receptacles may not be suitable for certain situations, such as car-washing shops, and field construction sites where a wet condition may exist and mobile electrical equipments may be used.

Although there are several types of GFCI plugs on the current market, they all rely on an electromagnetic coil to produce an electromagnetic force to maintain the GFCI plugs in its "ON" state when powered. When a circuit fault occurs, an integrated circuit (hereinafter "IC") within the GFCI plugs will generate a signal to cut off the power to the electromagnetic coil so as to set the GFCI plugs in its "OFF" state. Electric energy is consumed for the GFCI plugs to remain in its normal operation. Thus great relevance would be gained if an energy-saving GFCI device is designed.

Additionally, certain components of the GFCIs such as a metal oxide varistor (hereinafter "MOV") often fail due to the exposure to the nature, for example, in extreme high and/or low temperatures. The GFCIs on the market do not have a self-diagnosing function. It may present potential hazard if certain components of the GFCIs are failed.

Therefore, a heretofore unaddressed need exists in the art to address the aforementioned deficiencies and inadequacies.

SUMMARY OF THE INVENTION

In one aspect, the present invention relates to a GFCI, and more particularly, to an energy-saving permanent-magnet GFCI plug.

In one embodiment, the permanent-magnet GFCI plug has an enclosure and a permanent-magnet mechanism encased in the enclosure. The permanent-magnet mechanism in one embodiment includes a frame assembly. The frame assembly comprises a crossbeam having a first end portion and an opposite, second end portion, a frame pressure post and a core connecting post transversely extending from the first end potion and the second end portion of the crossbeam, respectively. The permanent-magnet mechanism further includes a core having a first end and an opposite, second end. The core is attached to the core connecting post of the frame assembly by the first end, and positioned inside a coil assembly. Moreover, the permanent-magnet mechanism includes a spring that is sleeved on the core connecting post of the frame assembly and positioned therebetween an inner cam of the coil assembly and the corssbeam of the frame assembly. Additionally, the permanent-magnet mechanism includes a circuit-breaking coil and a circuit-connecting coil that are wound on the outer surface of the coil assembly, respectively, and a permanent-magnet positioned proximately to the second end of the core. Furthermore, the permanent-magnet mechanism includes a pair of movable contact arms with each having a movable contact. The pair of movable contact arms are positioned at each lateral side of the frame pressure post for communicating with the frame assembly. The permanent-magnet mechanism also includes a pair of fixed contacts positioned above the corresponding movable contacts.

In operation, the circuit-connecting coil is powered and produces a magnetic force to repel the core away from the permanent-magnet and the resilient force of the spring causes the frame assembly to move a position such that the pair of the movable contacts are connected to the pair of fixed contacts.

In one embodiment, the pair of movable contacts are electrically connected to load terminals through the pair of movable contact arms. The pair of fixed contacts are electrically connected to a power source through a pair of fixed contact arms.

In another aspect, the present invention relates to an energy-saving permanent-magnet GFCI plug with self-diagnosing function. In one embodiment, the permanent-magnet GFCI plug has an enclosure and a permanent-magnet mechanism encased in the enclosure.

In one embodiment, the permanent-magnet mechanism includes a frame assembly and a core having a first end and an opposite, second end. The frame assembly comprises a crossbeam having a first end portion and an opposite, second end portion, a frame pressure post and a core connecting post transversely extending from the first end potion and the second end portion of the crossbeam, respectively. The core is attached to the core connecting post of frame assembly by the core's first end, and positioned inside a coil assembly. Furthermore, the permanent-magnet mechanism includes a spring that is sleeved on the core connecting post and positioned therebetween an inner cam of the coil assembly and the corssbeam of the frame assembly. Additionally, the permanent-magnet mechanism includes a circuit-breaking coil and a circuit-connecting coil that are wound on the outer surface of the coil assembly, respectively, and a permanent-magnet positioned proximately to the second end of the core.

The permanent-magnet mechanism further includes a pair of movable contact arms with each having a movable contact. In one embodiment, the pair of movable contacts are electrically connected to load terminals through the pair of movable contact arms. The pair of movable contact arms are positioned at each lateral side of the frame pressure post for communicating with the frame assembly. The permanent-magnet mechanism also includes a pair of fixed contacts positioned above the corresponding movable contacts. In one embodiment, the pair of fixed contacts are electrically connected to a power source through a pair of fixed contact arms.

Moreover, the permanent-magnet mechanism further includes a metal oxide varistor having a first end and a second end, with the first end electrically connected to a first terminal of a power source directly and the second end electrically connected to a second terminal of the power source from a load side across a circuit breaker. In one embodiment, the circuit breaker is formed by the pair of movable contacts and the pair of fixed contacts. The metal oxide varistor is adapted for self-diagnosing a fault circuit therein.

In operation, the circuit-connecting coil is powered and produces a magnetic force to repel the core away from the permanent-magnet and the resilient force of the spring causes the frame assembly to move a position such that the pair of the movable contacts are connected to the pair of fixed contacts.

In yet another aspect, the present invention relates to a water-proof, energy-saving permanent-magnet GFCI plug with self-diagnosing function. In one embodiment, the permanent-magnet GFCI plug has a water-proof enclosure and a permanent-magnet mechanism encased in the water-proof enclosure. The water-proof enclosure in one embodiment includes a face portion, a rear portion, a water-proof rubber washer positioned therebetween the face portion and the rear portion, a thin-film covering the face portion, and a water-proof connector formed at a load terminal of the enclosure.

In a further aspect, the present invention relates to an energy-saving permanent-magnet mechanism. In one embodiment, the permanent-magnet mechanism includes a frame assembly, a core having a first end and an opposite, second end and a spring. The frame assembly comprises a crossbeam having a first end portion and an opposite, second end portion, a frame pressure post and a core connecting post transversely extending from the first end potion and the second end portion of the crossbeam, respectively. The core is attached to the core connecting post of the frame assembly by the core's first end, and positioned inside a coil assembly. The spring is sleeved on the core connecting post of the frame assembly and positioned therebetween an inner cam of the coil assembly and the corssbeam of the frame assembly. Additionally, the permanent-magnet mechanism includes a circuit-breaking coil and a circuit-connecting coil that are wound on the outer surface of the coil assembly, respectively, and a permanent-magnet positioned proximately to the second end of the core. Furthermore, the permanent-magnet mechanism includes a pair of movable contact arms with each having a movable contact. The pair of movable contact arms are positioned at each lateral side of the frame pressure post for communicating with the frame assembly. The permanent-magnet mechanism also includes a pair of fixed contacts positioned above the corresponding movable contacts.

In operation, the circuit-connecting coil is powered and produces a magnetic force to repel the core away from the permanent-magnet and the resilient force of the spring causes the frame assembly to move a position such that the pair of the movable contacts are connected to the pair of fixed contacts.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1A:
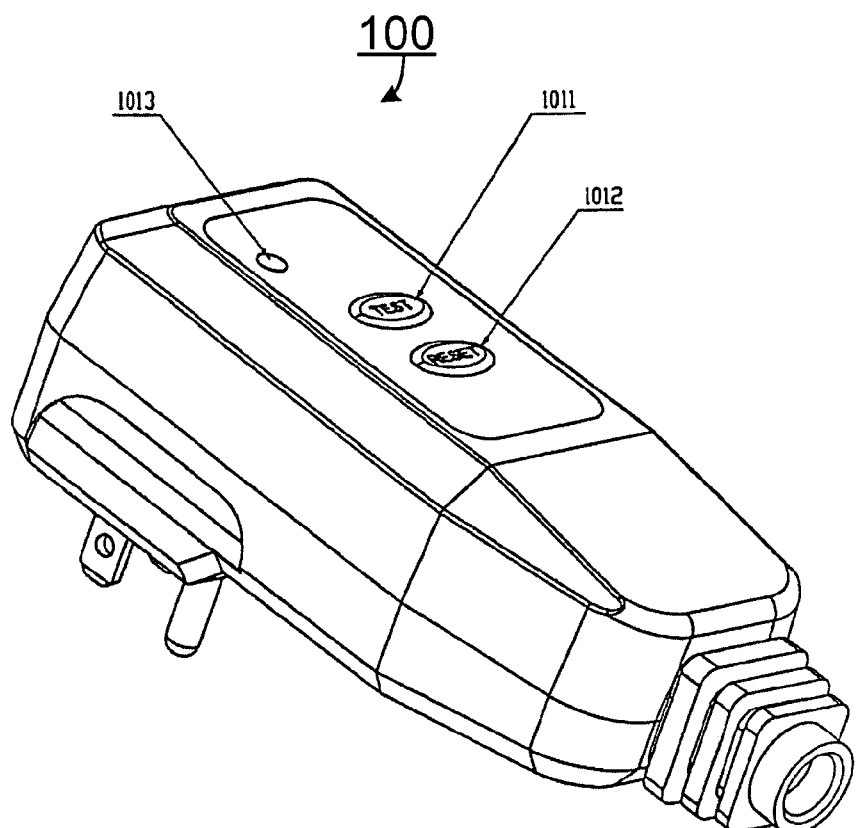
FIG. 1 shows perspective views of a GFCI plug from different angles (A) and (B) according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings 1–7. In accordance with the purposes of this invention, as embodied and broadly described herein, this invention, in one aspect, relates to an energy-saving, permanent-magnet GFCI plug with a self-diagnosing function.

Figure 1B:
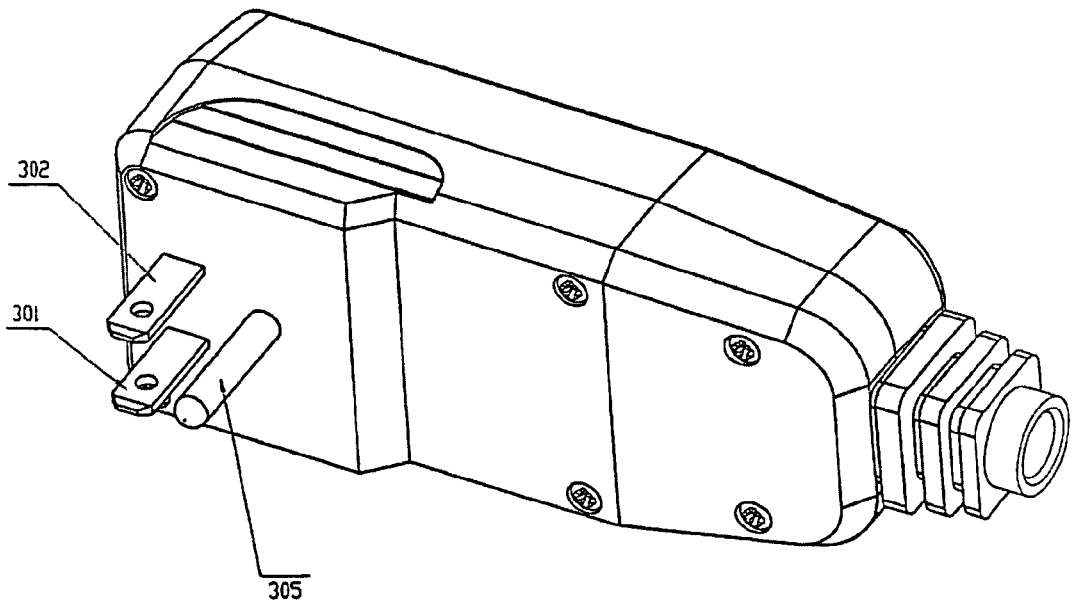
Figure 2:
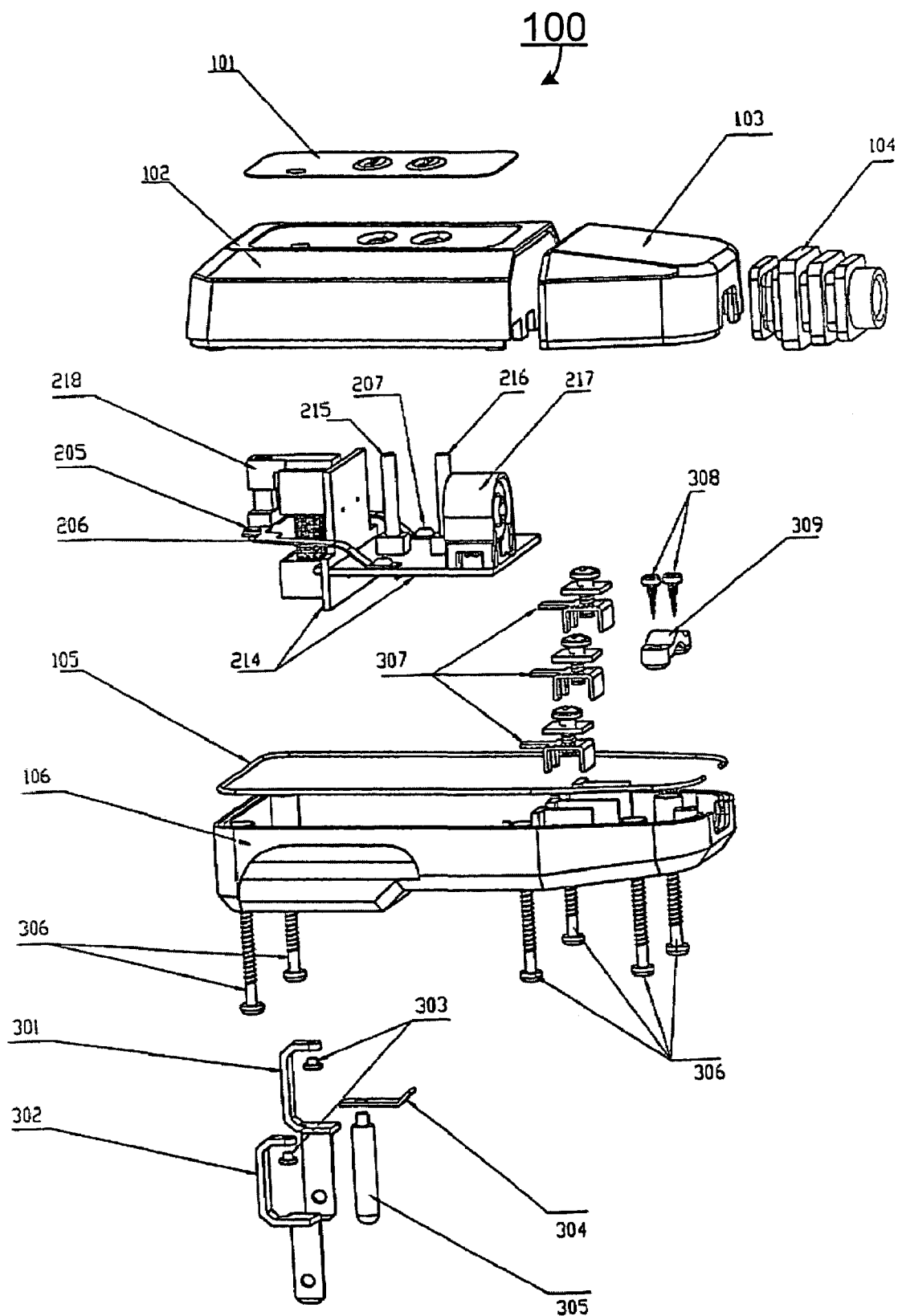
FIG. 2 is an exploded perspective view of a GFCI plug according to one embodiment of the present invention.
Figure 3:
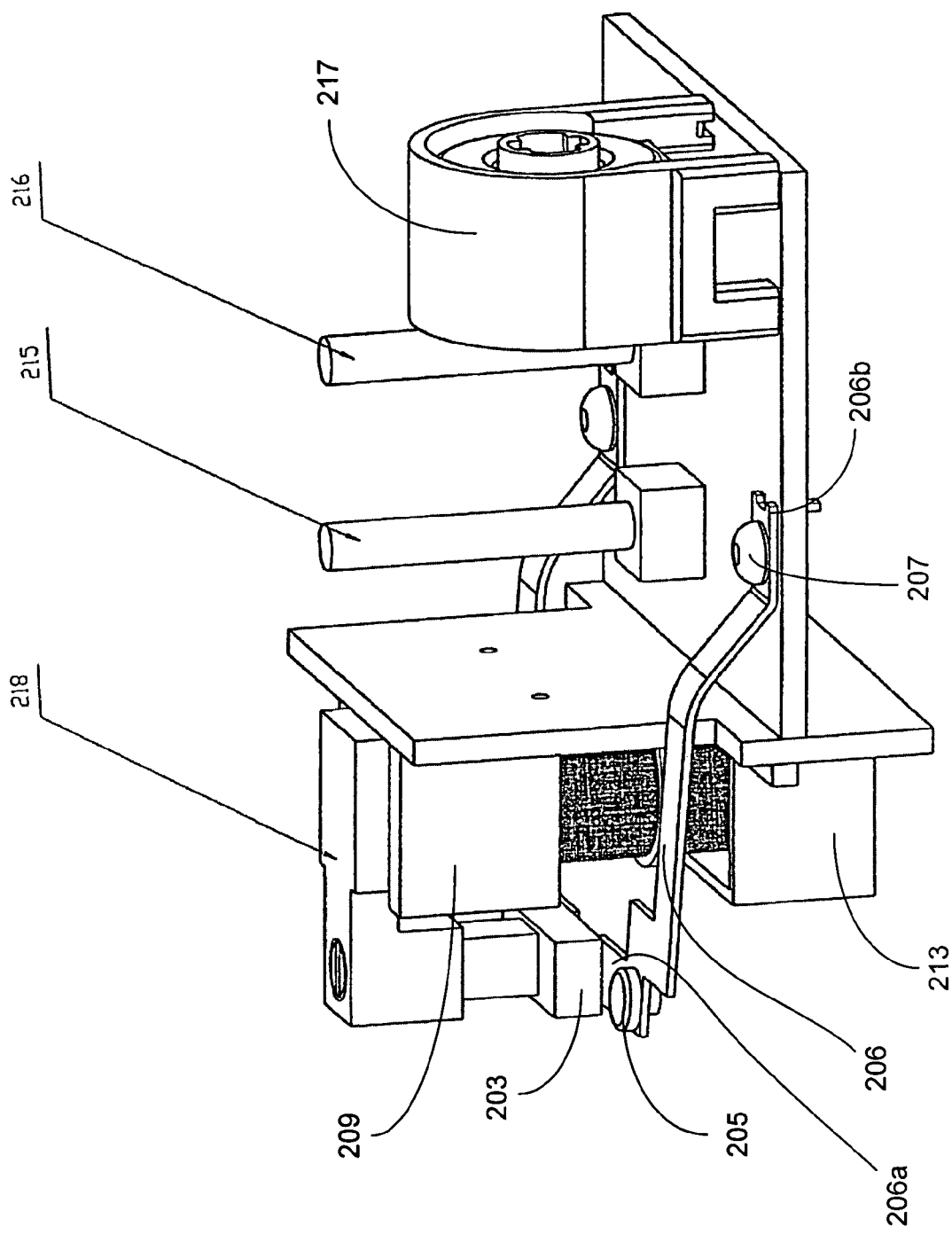
FIG. 3 is a perspective view of a permanent-magnet mechanism shown in FIG. 2.
Figure 4:
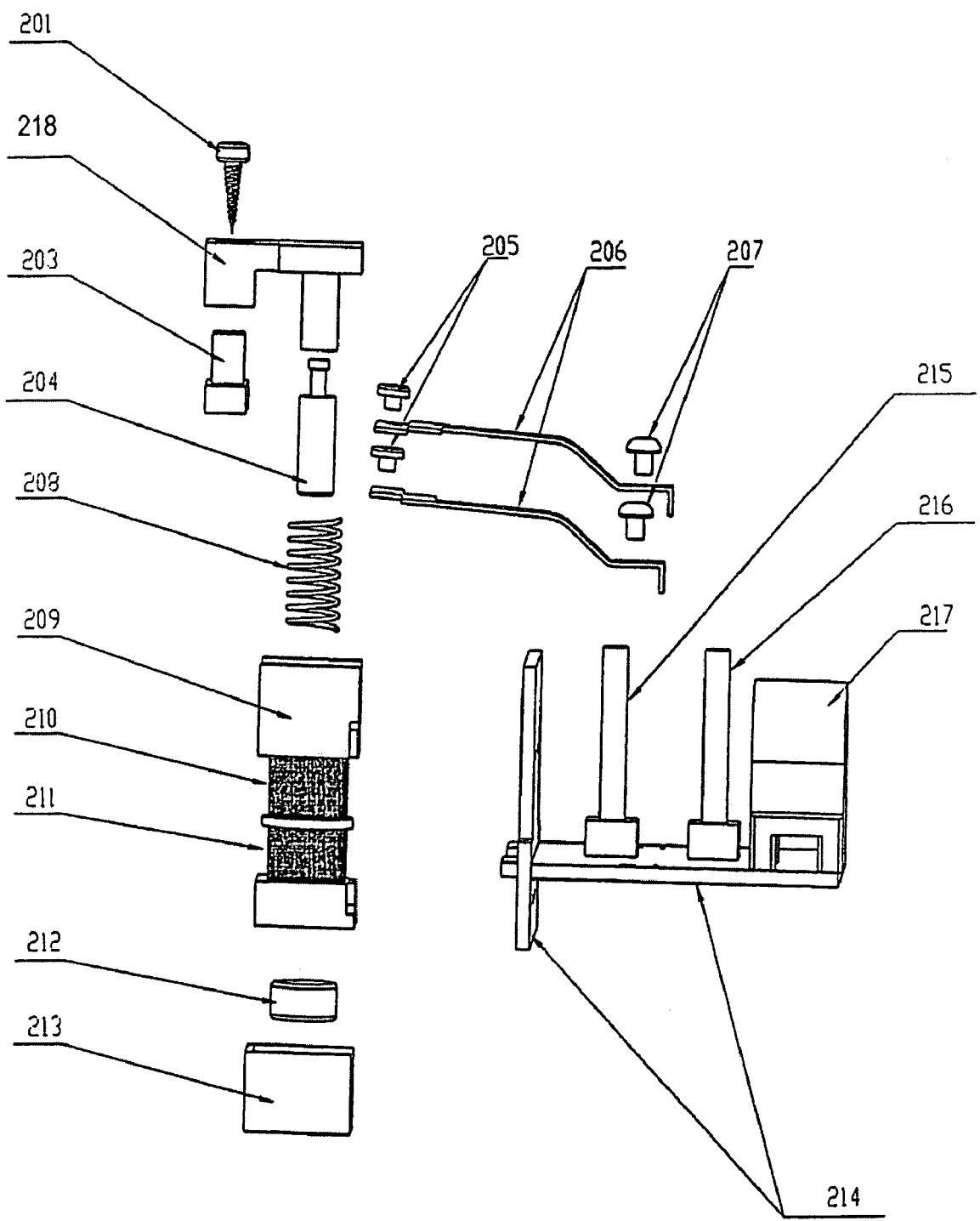
FIG. 4 is an exploded view of the permanent-magnet mechanism shown in FIG. 3.

Referring in general to FIG. 1–6, a permanent-magnet GFCI plug 100 comprises an enclosure and a permanent-magnet mechanism received in the enclosure. In one embodiment, as shown in FIGS. 1 and 2, the enclosure includes a face portion having a first portion 102 and a second portion 103, and a rear portion 106, and a rubber washer 105 positioned therebetween the face portion 102 and 103 and the rear portion 106. The rubber washer 105 is adapted for water-proofing. The enclosure further includes a film-coated faceplate 101 for covering a indicator lamp window 1013, a test button 1011 and a reset button 1012 of the GFCI plug 100. Additionally, the enclosure has a water-tight load connector 104 formed on an enclosure end for connecting to a load. The water-tight load connector 104 is used to prevent water from getting into the enclosure.

In one embodiment, the permanent-magnet mechanism, as shown in FIG. 2–6, includes a frame assembly 218. The frame assembly 218 has a crossbeam 218a having a first end portion 218a1 and an opposite, second end portion 218a2, a frame pressure post 218b and a core connecting post 218c transversely extending from the first end portion 218a1 and the second end portion 218a2 of the crossbeam 218a, respectively. In one embodiment, the frame assembly 218 further has a frame pressure block 203 attached to the frame pressure post 218b. Furthermore, the permanent-magnet mechanism includes a core 204 having a first end 204a and an opposite, second end 204b. The core 204 is attached to the core connecting post 218c of the frame assembly 218 and positioned inside a coil assembly 209. Moreover, the permanent-magnet mechanism includes a spring 208 that is sleeved on the core connecting post 218c of the frame assembly 218 and positioned therebetween an inner cam 209a of the coil assembly 209 and the crossbeam 218a of the frame assembly 218. Additionally, the permanent-magnet mechanism includes a circuit-breaking coil 211 and a circuit-connecting coil 210 that are wound on the outer surface of the coil assembly 209, respectively. The permanent-magnet mechanism also includes a permanent-magnet 212 positioned at a bottom portion 209b of the of the coil assembly 209 and proximate to the second end 204b of the core 204. The permanent-magnet 212 is adapted for communicating with the core 204. The permanent-magnet mechanism further includes a pair of movable contact arms 206 with each having a movable contact 205, and a pair of fixed contact arms (power pins) 301 and 302 with each having a fixed contact 303. In one embodiment, the pair of movable contact arms 206 are positioned at each lateral side of the frame pressure block 203 of the frame assembly 218, for communicating with the frame assembly 218. In one embodiment, the frame assembly 218 presses the pair of movable contact arms 206. In another embodiment, the frame assembly 218 releases the pair of movable contact arms 206. The pair of fixed contacts 303 are positioned above the corresponding pair of movable contacts 205.

In one embodiment, the circuit-connecting coil 210 is adapted such that when powered on, it produces an electromagnetic force to cause the core 204 to move away from the permanent-magnet 212. A resilient force of the spring 208 causes the frame assembly 218 to move to a position that the movable contact arms 206 are released from the frame pressure post 218b, thus the movable contacts 205 are connected to the corresponding fixed contacts 303, which is caused by a resilient force of the movable contact arms 206.

In other words, the movable contacts 205 and the fixed contacts 303 are contacted by the resilient force of the movable contact arms 206. Only a very short period of time is needed to power up the coil assembly 209 to separate the core 204 from the permanent-magnet 212. Thus, the consumption of electric energy is reduced to the minimum.

Figure 5A:
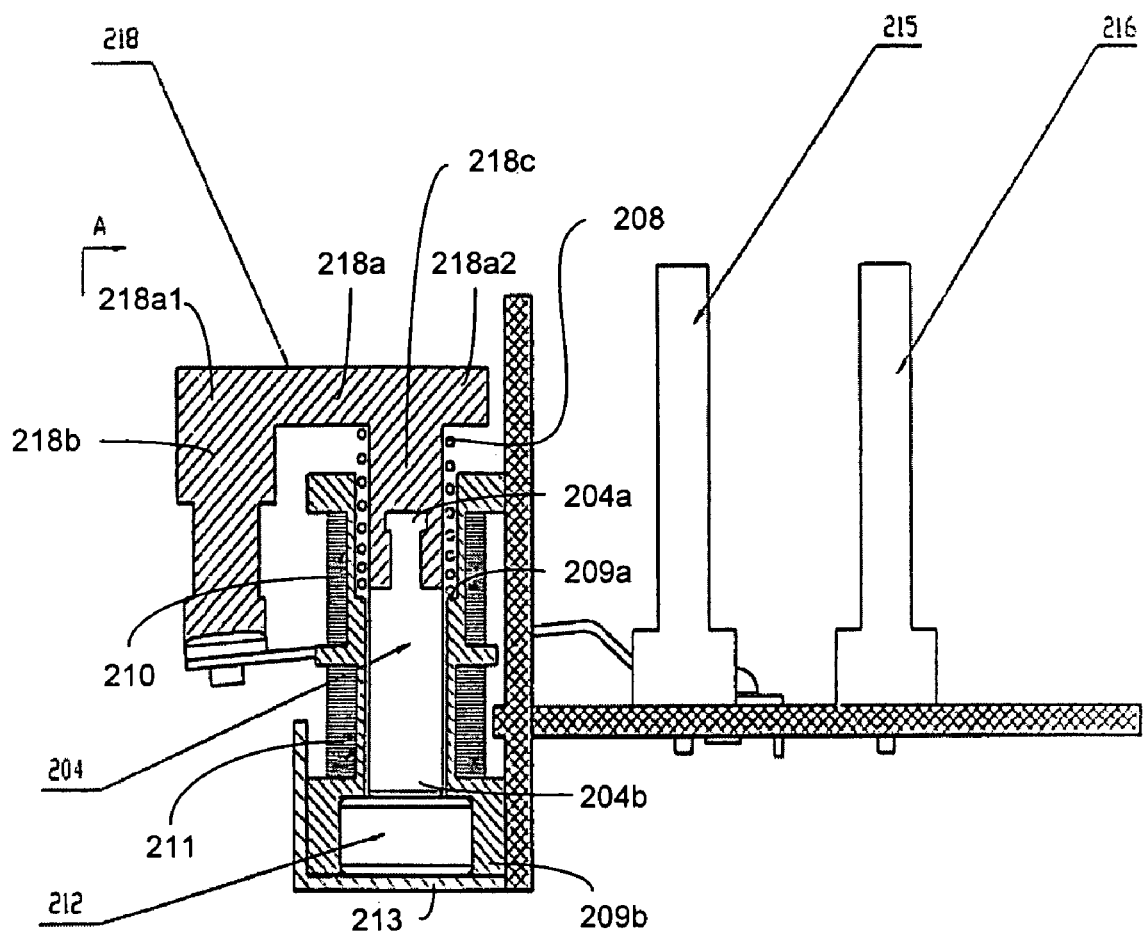
FIG. 5 shows respectively (A) a side view and (B) a front view of the permanent-magnet mechanism shown in FIG. 3 where the circuit breaker is in an open position.
Figure 5B:
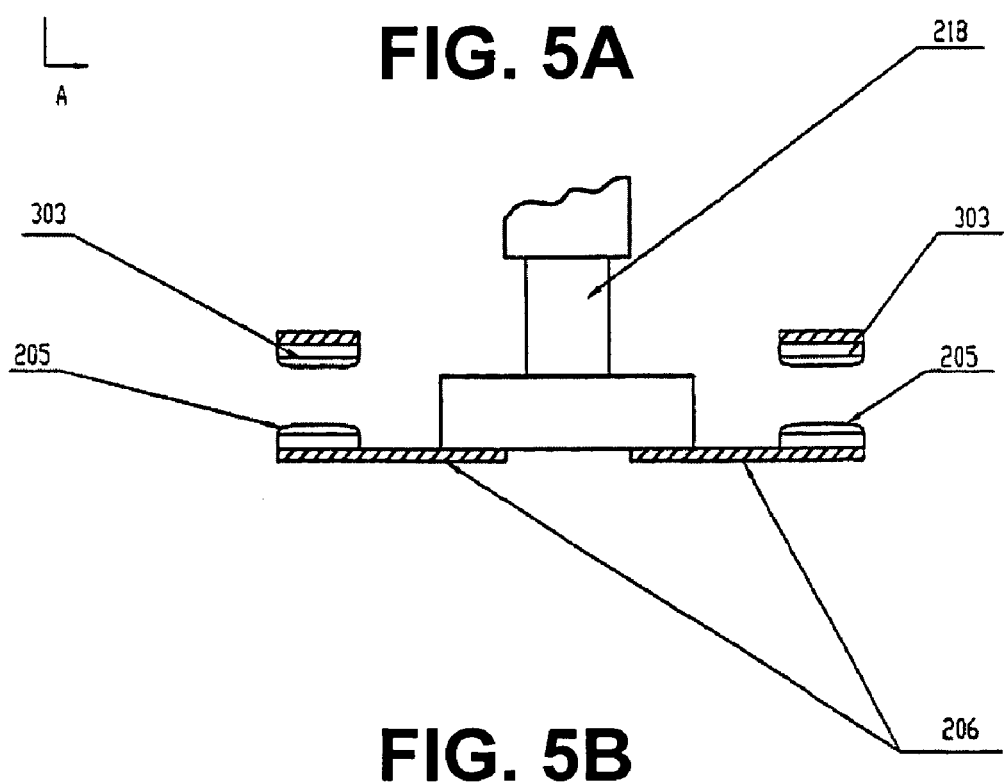

FIG. 5 illustrates the GFCI in an OFF state of which the circuit breaker is in an open state, where no current through the circuit breaker is allowed. In this embodiment, the core 204 is engaged with the permanent-magnet 206 and thus the frame assembly 218 is pulled down. As a result, the frame pressure block 203 of the frame assembly 218 presses the movable contact arms 206 down so as to separate the movable contacts 205 from the fixed silver contacts 303. The GFCI remains in the OFF state by an attractive magnetic force between the permanent-magnet 212 and the core 204 until the reset button 1012 is pressed. The attractive magnetic force is generated by the circuit-breaking coil 211 when is powered.

In one embodiment, the circuit breaker comprises a pair of movable contacts 205 electrically connecting to the load side via the movable contact arms 206 and a pair of fixed contacts 303 electrically connecting to the power source (line) side via the fixed contact arms (power pin) 301 and 302.

Figure 6A:
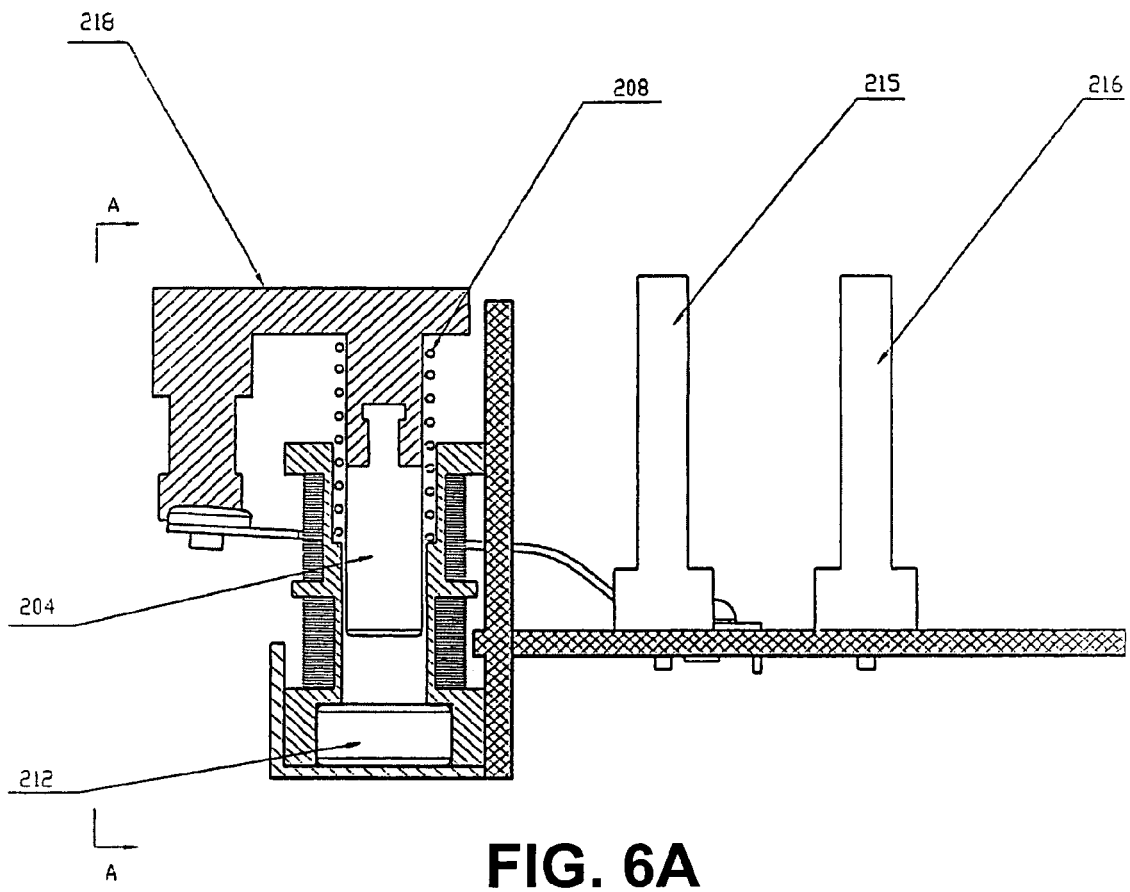
FIG. 6 shows respectively (A) a side view and (B) a front view of the permanent-magnet mechanism shown in FIG. 3 where the circuit breaker is in a closed position.
Figure 6B:
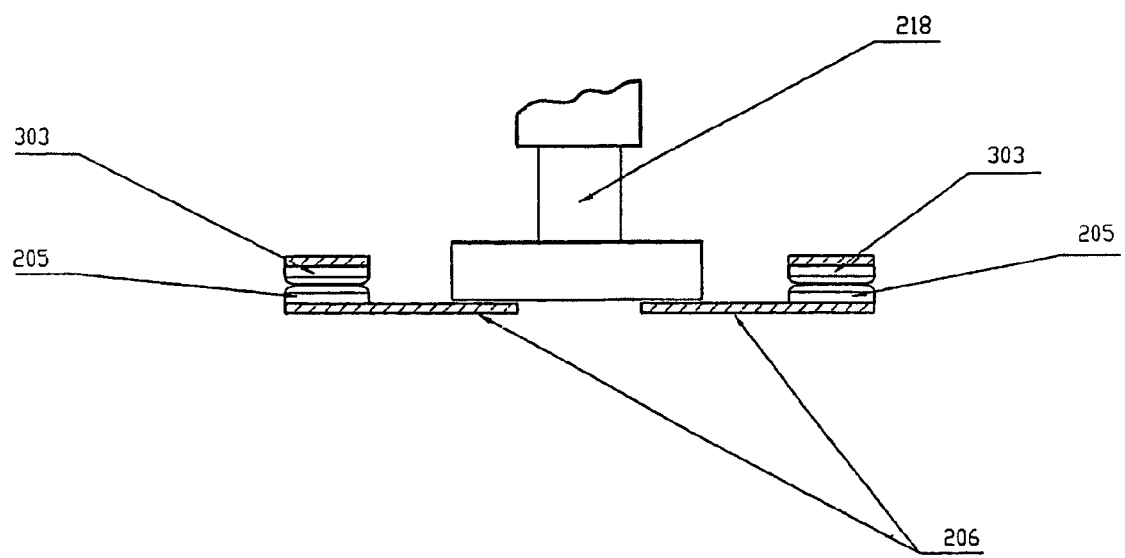

FIG. 6 shows the GFCI in an ON state of which the circuit breaker is in a closed state, where current through the circuit breaker is allowed. In this embodiment, the core 204 is apart from the permanent-magnet 206 and thus the frame assembly 218 moves to a position that the movable contact arms 206 are not pressed by the frame pressure block 203 of the frame assembly 218, which is caused by a resilient force of the spring 208. As a result, the movable contacts 205 and the fixed contacts 303 are engaged, and the frame assembly 218 and the movable contact arms 206 are separated. The separation of the core 204 from the permanent-magnet 212 is due to a repelling magnetic force generated by the circuit-connecting coil 210 when it is powered. The resilient force of the spring 208 will keep the GFCI in the ON state until a fault circuit is detected.

As assembled, a permanent-magnet mechanism is received in a water-proof enclosure and secured with a plurality of screws 306, as shown in FIG. 2. Other securing means can also be employed to practice the present invention. In one embodiment of the permanent-magnet mechanism as assembled and shown in FIGS. 3–6, the core 204 is engaged with the core connecting post 218c of the frame assembly 218, for example, by injection molding, and placed inside the coil assembly 209. The spring 208 is sleeved on the core connecting post 218c of the frame assembly 218, and positioned between an inner cam 209a of the coil assembly 209 and a lower portion of the crossbeam 218a of frame assembly 218. The circuit-breaking coil 211 and the circuit-connecting coil 210 are wound on the outer surface of the coil assembly 209, respectively. The permanent-magnet 212 is located in the bottom portion 209b of the coil assembly 209 for communicating with the core 204. The bottom portion 209b of the coil assembly 209 is then surrounded with a magnetic shield 213. The movable contacts 205 are attached to the first end portion 206a of the movable contact arms 206. The movable contact arms 206 in turned are secured to a circuit board 214 by rivets 207 at its second end portion 206b. A frame pressure block 203 is attached to the frame pressure post 218b of the frame assembly 218 for communicating with the movable contact arms 206. In one embodiment, the frame pressure block 203 presses the movable contact arms 206. In another embodiment, the frame pressure block 203 releases the movable contact arms 206. The fixed silver contacts 303 are attached to an end of the fixed contact arms 301 and 302. The fixed contact arms 301 and 302 are engaged with power pins and secured on the rear portion 106 of the enclosure. In one embodiment, the fixed silver contacts 303 are affixed at the positions corresponding to the movable silver contacts 205 to form a pair of contacts. In addition, the wiring mechanism including a grounding strap 304, a grounding pin 305, wiring terminals 307, wire-pressing screws 308 and a wire-pressing board 309 is installed. A test switch 215, a reset switch 216 and a transformer bracket 217 are also mounted onto the circuit board 214.

Figure 7:
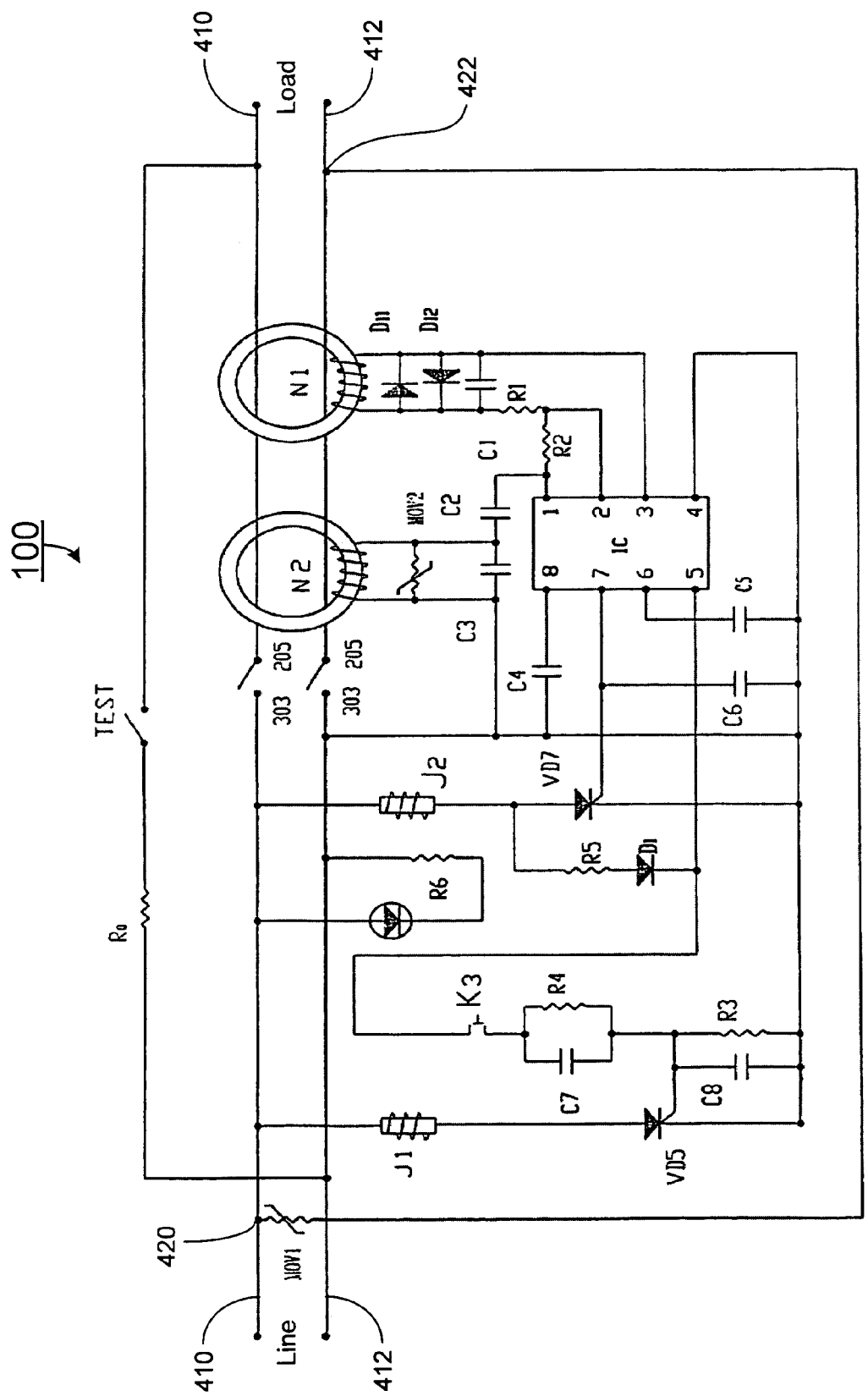
FIG. 7 Shows A Circuit Diagram Of A Gfci With A Self-Diagnosing Function According To One Embodiment Of The Present Invention.

Referring to FIG. 7, the permanent-magnet GFCI plug 100 also includes a metal oxide varistor MOV1 with one end 420 electrically connected to a first terminal 410 of the power source (line) and the other end 422 electrically connected to a second terminal 412 of the power source (line) from a load side across a circuit breaker, respectively.

In the exemplary embodiment, the metal oxide varistor MOV1 is not connected in parallel to the power source (line), but connected through a circuit breaker to the load terminal. A leakage current-sensing transformer N1 in the GFCI is utilized to detect a fault current through the metal oxide varistor MOV1, which is equivalent to a leakage current protection. When a fault current through the metal oxide varistor MOV1 exceeds a predetermined threshold, the circuit breaker is trigged to be in its open state. Thus, a self-diagnosing function in the GFCI is achieved.

The test switch 215 and reset switch 216 include two micro switches and are represented by the switch TEST and switch K3 shown in FIG. 7, respectively.

Referring now to FIGS. 1–7, the operational principle of the present invention is described as follows.

When the fixed contact arms and the power pins 301 and 302 as well as the grounding pin 305 are connected to an electric power source through an outlet, the circuit board 214 is turned on and the GFCI is in the ON state. When the reset button 1012 is pressed, the reset micro switch 216, thus the switch K3 shown in FIG. 7, is closed, where current through the switch K3 is allowed. As shown in FIG. 7, one end of the switch K3 is connected to the hot wire of the power line through a diode D1, a resistor R5 and a coil J2, which corresponds to the circuit-breaking coil 211. While the other end of the switch K3 is connected to the neutral wire of the power line through a resistor R4, a capacitor C7 and then a resistor R3. When the switch K3 is closed, a pulse signal is generated at the joined terminals of R3 and R4 to turn on the silicon controlled rectifier VD5. A greater amount of current passes through the VD5 and a coil J1, which corresponds to the circuit-connecting coil 210, electrically connected to the VD5. The electromagnetic force generated by the powered coil J1 pushes the core 204 and thus the frame assembly 218 to move outward the permanent-magnet 212 and thus release the frame pressure post 218b of the frame assembly 218 from the movable contact arms 206. Consequently, the movable contact arms 206 moves upward by its resilient force, which causes the movable silver contacts 205 contact with the fixed silver contacts 303 on the fixed contact arms 301 and 302. Therefore, electric power is delivered to the load terminal through the connection between the fixed silver contacts 303 and the movable silver contacts 205.

The electric current through the GFCI will be cut-off when a ground fault occurs or the test button is pressed.

When a leakage current fault or a neutral ground fault exists, the leakage current-sensing transformer N1 as shown in FIG. 7 detects the fault current and delivers it to the pin 2 and pin 3 of a integrate circuit (IC). The fault current is then amplified. If the current reaches a predetermined threshold, the pin 7 of the IC will send a pulse signal to the gate of the silicon controlled rectifier VD7 causing the VD7 to be switched on. After the VD7 is switched on, a greater amount of current passes through the VD7 and the coil J2, i.e., the circuit-breaking coil 211, connected to the VD7. The electromagnetic force generated by the current passing through the circuit-breaking coil 211 causes the core 204 and thus the frame assembly 218 to move toward the permanent-magnet 212 so that the frame pressure post 218b of the fram assembly 218 presses the movable contact arms 206 down. As a result, the movable silver contacts 205 are completely separated from the fixed silver contacts 303. In this embodiment, the permanent-magnet 212 is firmly engaged with the core 204 and the magnetic force keeps the GFCI in the open state.

In one embodiment, the fault circuit can be simulated by pressing the test button 1011. The test function is adapted for testing whether the GFCI works properly. When the test button 1011 is pressed, a test micro switch 215 positioned at the lower portion of the test button 1011 is also being pressed down, which causes the switch TEST shown in FIG. 7 to be closed, where current through the switch TEST is allowed. As shown in FIG. 7, one end of the switch TEST is electrically connected to the hot wire of the load terminal, while the other end is electrically connected to the neutral wire of the power line terminal through a resistor R0. When the switch TEST is closed, a simulated leakage fault current passes through this loop causing the power from the GFCI to the load to be cut-off. Such a cut-off clearly indicates a good working condition of the GFCI device.

In one embodiment, the GFCI includes a self-diagnosing function. A GFCI may be damaged due to its working environment and abnormal usage. If such damages are not detected in time, it may result in serious consequences, such as, fault protection of the MOV. In one embodiment shown in FIG. 7, one end 420 of the metal oxide varistor MOV1 is electrically connected to the hot wire 410 of the power line side, while the other end 422 electrically connected to the neutral wire 412 of the load side. Under a normal condition, the metal oxide varistor MOV1 is in an open circuit and its current in an order of μA does not affect the GFCI's normal operation. However, when the leakage current of the metal oxide varistor MOV1 reaches about 5 mA due to an adverse condition, the sensing transformer N1 of the GFCI detects this micro-current and sends it to the IC to cut-off the power from the GFCI. The principle to cut-off the power from the GFCI is the same as the leakage current protection. Meanwhile, since the metal oxide varistor MOV1 is disconnected from power, the metal oxide varistor MOV1 and GFCI are no longer capable of causing further damages.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A permanent-magnet ground fault circuit interrupter (GFCI) plug, comprising:
   a. an enclosure; and
   b. a permanent-magnet mechanism encased in the enclosure, comprising:
      i. a frame assembly (218) including a crossbeam (218a) having a first end portion (218a1) and an opposite, second end portion (218a2), a frame pressure post (218b) and a core connecting post (218c) transversely extending from the first end potion (218a1) and the second end portion (218a2) of the crossbeam (218a), respectively;
      ii. a core (204) having a first end (204a) and an opposite, second end (204b), attached to the core connecting post (218c) of the frame assembly (218) by the first end (204a), and positioned inside a coil assembly (209);
      iii. a spring (208) sleeved on the core connecting post (218c) of the frame assembly (218), and positioned therebetween an inner cam (209a) of the coil assembly (209) and the corssbeam (218a) of the frame assembly 218;
      iv. a circuit-breaking coil (211) and a circuit-connecting coil (210) wound on the outer surface of the coil assembly (209), respectively;
      v. a permanent-magnet (212) positioned proximately to the second end (204b) of the core (204);
      vi. a pair of movable contact arms (206), each having a movable contact (205), positioned at each lateral side of the frame pressure post (218b) of the frame assembly (218) for communicating with the frame assembly (218); and
      vii. a pair of fixed contacts (303) positioned above the corresponding movable contacts (205), wherein, in operation, the circuit-connecting coil (210) is powered and produces a magnetic force to repel the core (204) away from the permanent-magnet (212) and the resilient force of the spring (208) causes the frame assembly (218) to move to a position such that the pair of movable contacts (205) are connected to the pair of fixed contacts (303) by an elastic force of the movable contact arms (206).

2. The permanent-magnet GFCI plug of claim 1, wherein the pair of movable contacts (205) are electrically connected to load terminals through the pair of movable contact arms (206).

3. The permanent-magnet GFCI plug of claim 1, wherein the pair of fixed contacts (303) are electrically connected to a power source through a pair of fixed contact arms (301 and 302).

4. A permanent-magnet GFCI plug with a self-diagnosing function, comprising:
   a. an enclosure; and
   b. a permanent-magnet mechanism encased in the enclosure, having:
      i. a frame assembly (218) including a crossbeam (218a) having a first end portion (218a1) and an opposite, second end portion (218a2), a frame pressure post (218b) and a core connecting post (218c) transversely extending from the first end potion (218a1) and the second end portion (218a2) of the crossbeam (218a), respectively;
      ii. a core (204) having a first end (204a) and an opposite, second end (204b), attached to the core connecting post (218c) of the frame assembly (218) by the first end (204a), and positioned inside a coil assembly (209);
      iii. a spring (208) sleeved on the core connecting post (218c) of the frame assembly (218), and positioned therebetween an inner cam (209a) of the coil assembly (209) and the corssbeam (218a) of the frame assembly 218;
      iv. a circuit-breaking coil (211) and a circuit-connecting coil (210) wound on the outer surface of the coil assembly (209), respectively;
      v. a permanent-magnet (212) positioned proximately to the second end (204b) of the core (204);
      vi. a pair of movable contact arms (206), each having a movable contact (205), positioned at each lateral side of the frame pressure post (218b) of the frame assembly (218) for communicating with the frame assembly (218);
      vii. a pair of fixed contacts (303) positioned above the corresponding movable contacts (205); and
      viii. a metal oxide varistor having a first end and a second end, with the first end electrically connected to a first terminal of a power source directly and the second end electrically connected to a second terminal of the power source from a load side across a circuit breaker;
wherein, in operation, the circuit-connecting coil (210) is powered and produces a magnetic force to repel the core (204) away from the permanent-magnet (212) and the resilient force of the spring (208) causes the frame assembly (218) to move to a position such that the pair of movable contacts (205) are connected to the pair of fixed contacts (303).

5. The permanent-magnet GFCI plug of claim 4, wherein the pair of movable contacts (205) are connected to load terminals through the pair of movable contact arms (206).

6. The permanent-magnet GFCI plug of claim 4, wherein the pair of fixed contacts (303) are connected to the power source through a pair of fixed contact arms (301 and 302).

7. The permanent-magnet GFCI plug of claim 4, wherein the circuit breaker is formed by the pair of movable contacts and the pair of fixed contacts.

8. The permanent-magnet GFCI plug of claim 4, wherein the metal oxide varistor is adapted for self-diagnosing a fault circuit therein.

9. A permanent-magnet GFCI plug with a self-diagnosing function, comprising:
   a. a water-proof enclosure having a face portion (102 and 103), a rear portion (106), a water-proof rubber washer (105) positioned therebetween the face portion (102 and 103) and the rear portion (106), a thin-film (101) covering the face portion (102), and a water-proof connector (104) formed at a load terminal of the enclosure; and
   b. a permanent-magnet mechanism encased in the said water-proof enclosure, having:
      i. a frame assembly (218) including a crossbeam (218a) having a first end portion (218a1) and an opposite, second end portion (218a2), a frame pressure post (218b) and a core connecting post (218c) transversely extending from the first end potion (218a1) and the second end portion (218a2) of the crossbeam (218a), respectively;
      ii. a core (204) having a first end (204a) and an opposite, second end (204b), attached to the core connecting post (218c) of the frame assembly (218) by the first end (204a), and positioned inside a coil assembly (209);
      iii. a spring (208) sleeved on the core connecting post (218c) of the frame assembly (218), and positioned therebetween an inner cam (209a) of the coil assembly (209) and the corssbeam (218a) of the frame assembly 218;
      iv. a circuit-breaking coil (211) and a circuit-connecting coil (210) wound on the outer surface of the coil assembly (209), respectively;
      v. a permanent-magnet (212) positioned proximately to the second end (204b) of the core (204);
      vi. a pair of movable contact arms (206), each having a movable contact (205), positioned at each lateral side of the frame pressure post (218b) of the frame assembly (218) for communicating with the frame assembly (218);
      vii. a pair of fixed contacts (303) positioned above the corresponding movable contacts (205); and
      viii. a metal oxide varistor having a first end and a second end, with the first end electrically connected to a first terminal of a power source directly and the second end electrically connected to a second terminal of the power source from a load side across a circuit breaker;
wherein, in operation, the circuit-connecting coil (210) is powered and produces a magnetic force to repel the core (204) away from the permanent-magnet (212) and the resilient force of the spring (208) causes the frame assembly (218) to move to a position such that the pair of movable contacts (205) are connected to the pair of fixed contacts (303).

10. The permanent-magnet GFCI plug of claim 9, wherein the pair of movable contacts (205) are connected to the load terminal through the pair of movable contact arms (206).

11. The permanent-magnet GFCI plug of claim 9, wherein the pair of fixed contacts (303) are connected to the power line through a pair of fixed contact arms (301, 302).

12. The permanent-magnet GFCI plug of claim 9, wherein the circuit breaker is formed by the pair of movable contacts and the pair of fixed contacts.

13. The permanent-magnet GFCI plug of claim 9, wherein the metal oxide varistor is adapted for self-diagnosing a fault circuit therein.

14. A permanent-magnet mechanism, comprising:
   i. a frame assembly (218) including a crossbeam (218*a*) having a first end portion (218*a*1) and an opposite, second end portion (218*a*2), a frame pressure post (218*b*) and a core connecting post (218*c*) transversely extending from the first end potion (218*a*1) and the second end portion (218*a*2) of the crossbeam (218*a*), respectively;
   ii. a core (204) having a first end (204*a*) and an opposite, second end (204*b*), attached to the core connecting post (218*c*) of the frame assembly (218) by the first end (204*a*), and positioned inside a coil assembly (209);
   iii. a spring (208) sleeved on the core connecting post (218*c*) of the frame assembly (218), and positioned therebetween an inner cam (209*a*) of the coil assembly (209) and the corssbeam (218*a*) of the frame assembly 218;
   iv. a circuit-breaking coil (211) and a circuit-connecting coil (210) wound on the outer surface of the coil assembly (209), respectively;
   v. a permanent-magnet (212) positioned proximately to the second end (204*b*) of the core (204);
   vi. a pair of movable contact arms (206), each having a movable contact (205), positioned at each lateral side of the frame pressure post (218*b*) of the frame assembly (218) for communicating with the frame assembly (218); and
   vii. a pair of fixed contacts (303) positioned above the corresponding movable contacts (205), wherein, in operation, the circuit-connecting coil (210) is powered and produces a magnetic force to repel the core (204) away from the permanent-magnet (212) and the resilient force of the spring (208) causes the frame assembly (218) to move to a position such that the pair of movable contacts (205) are connected to the pair of fixed contacts (303).

* * * * *